(12) United States Patent
Raviv et al.

(10) Patent No.: US 12,073,429 B2
(45) Date of Patent: *Aug. 27, 2024

(54) GENERATING DYNAMIC CONTENT ITEM RECOMMENDATIONS

(71) Applicant: Yahoo Ad Tech LLC, New York, NY (US)

(72) Inventors: Ariel Raviv, Haifa (IL); Yair Koren, Haifa (IL); Eliran Abutbul, Qiryat Atta (IL); Omer Duvdevany, Tel Aviv (IL)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,263

(22) Filed: May 8, 2023

(65) Prior Publication Data
US 2023/0274312 A1 Aug. 31, 2023

Related U.S. Application Data

(63) Continuation of application No. 16/920,924, filed on Jul. 6, 2020, now Pat. No. 11,645,671.

(51) Int. Cl.
| | |
|---|---|
| G06Q 30/0242 | (2023.01) |
| G06F 40/20 | (2020.01) |
| G06N 5/04 | (2023.01) |
| G06N 20/00 | (2019.01) |
| G06Q 30/0201 | (2023.01) |
| G06Q 30/0251 | (2023.01) |
| G06Q 30/0273 | (2023.01) |
| G06Q 30/0282 | (2023.01) |
| G06Q 30/0601 | (2023.01) |

(52) U.S. Cl.
CPC ........ *G06Q 30/0246* (2013.01); *G06F 40/20* (2020.01); *G06N 5/04* (2013.01); *G06N 20/00* (2019.01); *G06Q 30/0201* (2013.01); *G06Q 30/0206* (2013.01); *G06Q 30/0261* (2013.01); *G06Q 30/0269* (2013.01); *G06Q 30/0275* (2013.01); *G06Q 30/0282* (2013.01); *G06Q 30/0631* (2013.01); *G06Q 30/0633* (2013.01)

(58) Field of Classification Search
CPC .......... G06Q 30/0246; G06Q 30/0201; G06Q 30/0206; G06Q 30/0261; G06Q 30/0269; G06Q 30/0275; G06Q 30/0282; G06Q 30/0631; G06Q 30/0633; G06F 40/20; G06F 40/131; G06F 40/295; G06N 5/04; G06N 20/00
See application file for complete search history.

(56) References Cited

U.S. PATENT DOCUMENTS 9,495,694 B1 * 11/2016 Balasubramanian ........................ G06F 16/583

* cited by examiner

*Primary Examiner* — Alexandru Cirnu
(74) *Attorney, Agent, or Firm* — Cooper Legal Group LLC

(57) ABSTRACT

One or more computing devices, systems, and/or methods for generating dynamic content item recommendations are provided. Content item information, extracted from message data, is aggregated to calculate popularity and attributes of content items. The content items are ranked based upon the popularity and attributes to generate a ranked list of content items. Exploration traffic is served utilizing a set of eligible content items selected from the ranked list of content items. An eligible content item is promoted for participation in auctions for serving non-exploration traffic based upon the eligible content item being served a threshold number of times.

20 Claims, 9 Drawing Sheets

GENERATING DYNAMIC CONTENT ITEM RECOMMENDATIONS

RELATED APPLICATION

This application claims priority to and is a continuation of U.S. application Ser. No. 16/920,924, filed on Jul. 6, 2020, entitled "GENERATING DYNAMIC CONTENT ITEM RECOMMENDATIONS", which is incorporated by reference herein in its entirety.

BACKGROUND

A content serving platform may be configured to provide information about content items (e.g., a content item recommendation of a product, a link to a service, an image, access to rent a movie, etc.) to client devices for display to users, such as display through a mobile application, a website, or other user interface. For example, the content serving platform may provide articles, images, links to content, videos, audio messages, recommendations, and/or a variety of other content items (content item recommendations) to the client devices. In an example, a user on a mobile device may access an email application. The email application may determine that two content items can be displayed within an email user interface through which emails of the user are displayed. The email application may transmit a request over a network from the mobile device to a computing device, such as a server, hosting the content serving platform. The content serving platform may utilize a model to rank/score content items based upon bid values that content providers will pay if content items are engaged with by users (e.g., a user clicks a content item recommendation, the user purchases a service or item described by a content item recommendation, a user views a content item recommendation, etc.) and predicted likelihoods that users will engage with the content items, which may be based upon content item attributes of content items and user attributes of users. In this way, one or more of the highest ranked content items may be selected and transmitted over the network to the mobile device for display through the email user interface.

SUMMARY

In accordance with the present disclosure, one or more computing devices and/or methods for generating dynamic content item recommendations are provided. A content serving platform is configured to serve traffic, corresponding to requests from remote devices for content items to display to users, with content items (content item recommendations) that are selected through an auction and bidding mechanism. The content serving platform may utilize a first model to serve exploration traffic and a second model to serve non-exploration but yet a broad audience traffic. The first model is used to generate scores for content items, and the scores are evaluated by an auction to determine which content items to serve in response to requests assigned to the exploration traffic. As the first model is used to serve exploration traffic during an exploration phase, feedback as to whether users engaged with or did not engage with the content items is obtained for training the second model. The second model is used to serve content items for which the second model can accurately predict user engagement for the content items because the second model has been trained based upon past user engagement with the content items or similar types of content items. However, other content items, such as new content items for which the second model has yet to be trained to accurately predict user engagement, are served for exploration traffic using the first model until a sufficient amount of user engagement feedback has been received for those content items in order to train the second model to accurately predict user engagement for the content items. Once the second model has been adequately trained to understand the types of users that will engaged with a content item, then the content item may be used to serve non-exploration traffic using the second model.

As provided herein, content item recommendations may be dynamically generated based upon content item information extracted from message data, such as emails, text messages, social network messages, and/or other types of messages. In an embodiment, the content item recommendations may be generated dynamically, and are initially used by the first model to serve exploration traffic notwithstanding a lack of additional information otherwise obtained through pixel data provided by content providers and services (e.g., a content provider may refuse to incorporate a pixel on a website that would trigger a notification to the content serving platform when a user performs an action such as landing at the website, purchasing an item, viewing content, etc.). Accordingly, content item information is extracted from message data, such as from receipts, order confirmations, delivery confirmations, recommendations, and/or a variety of other information within emails, text messages, social network messages, or other types of messages.

The extracted content item information is evaluated to identify attributes of content items and/or to calculate popularity of the content items. For example, text, images, HTML, attachments, and/or other content within messages may be extracted and evaluated using defined extraction rules, generated extraction rules, and/or online extraction to identify attributes of a content item, such as a brand, price, color, and size of a shirt (content item), along with a gender, location, age, and/or other demographic information of a user that purchased the shirt. A global popularity for the shirt may be determined based upon a number or percentage of messages within which information about the shirt occurred. Demographic popularities for the shirt may be determined based upon numbers or percentages of messages, associated with certain demographics of users, within which information about the shirt occurs (e.g., a demographic popularity of the shirt among women, a demographic popularity of the shirt among men, a demographic popularity of the shirt amongst people living in Michigan, etc.).

The content items are ranked based upon the popularity and/or the attributes of the content items to generate a ranked list of content items. For example, the more popular a content item, the higher the rank assigned to the content item. A set of eligible content items are selected from the ranked list of content items according to ranks of the content items (e.g., 100 highest ranked content items or any other number of content items may be selected for inclusion within the set of eligible content items). The first model is used to generate scores (e.g., a click probability multiplied by a content provider bid) for the eligible content items for participating in auctions to serve exploration traffic. A score may correspond to a bid value that a content provider of an eligible content item will pay for user interaction with the eligible content item (e.g., viewing a content item recommendation of the eligible content item, purchasing the eligible content item, clicking the content item recommendation of the eligible content item, etc.) and a predicted interaction probability that a particular user will interact with the eligible content item, which may be based upon the ranks (popularity) and attributes of the eligible content item such that more popular eligible content items may be assigned relatively higher predicted interaction probabilities. Performance of the eligible content items (e.g., a number of impressions of the content item recommendation being viewed, a number of conversions where user purchased the content item, a number of clicks on the content item recommendation etc.) may be tracked.

The performance of the eligible content items (content item recommendations) may be tracked to identify an eligible content item that has been served a threshold number of times. Once an eligible content item (e.g., a content item recommendation of the shirt) has been served a threshold number of times for exploration traffic, the eligible content item may be promoted as a promoted content item that is eligible for participation in auctions for serving non-exploration traffic using the second model. Accordingly, the second model may generate scores for the promoted content item based upon information tracked while the promoted content item was the eligible content item being served for non-exploration traffic (e.g., the second model may be trained using information relating to what types of users engaged with the eligible content item and what types of users ignored the eligible content item). In this way, the promoted content item (the content item recommendation) is used to serve non-exploration traffic (e.g., the ability to submit bids through auctions on opportunities to display the content item recommendation to users).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
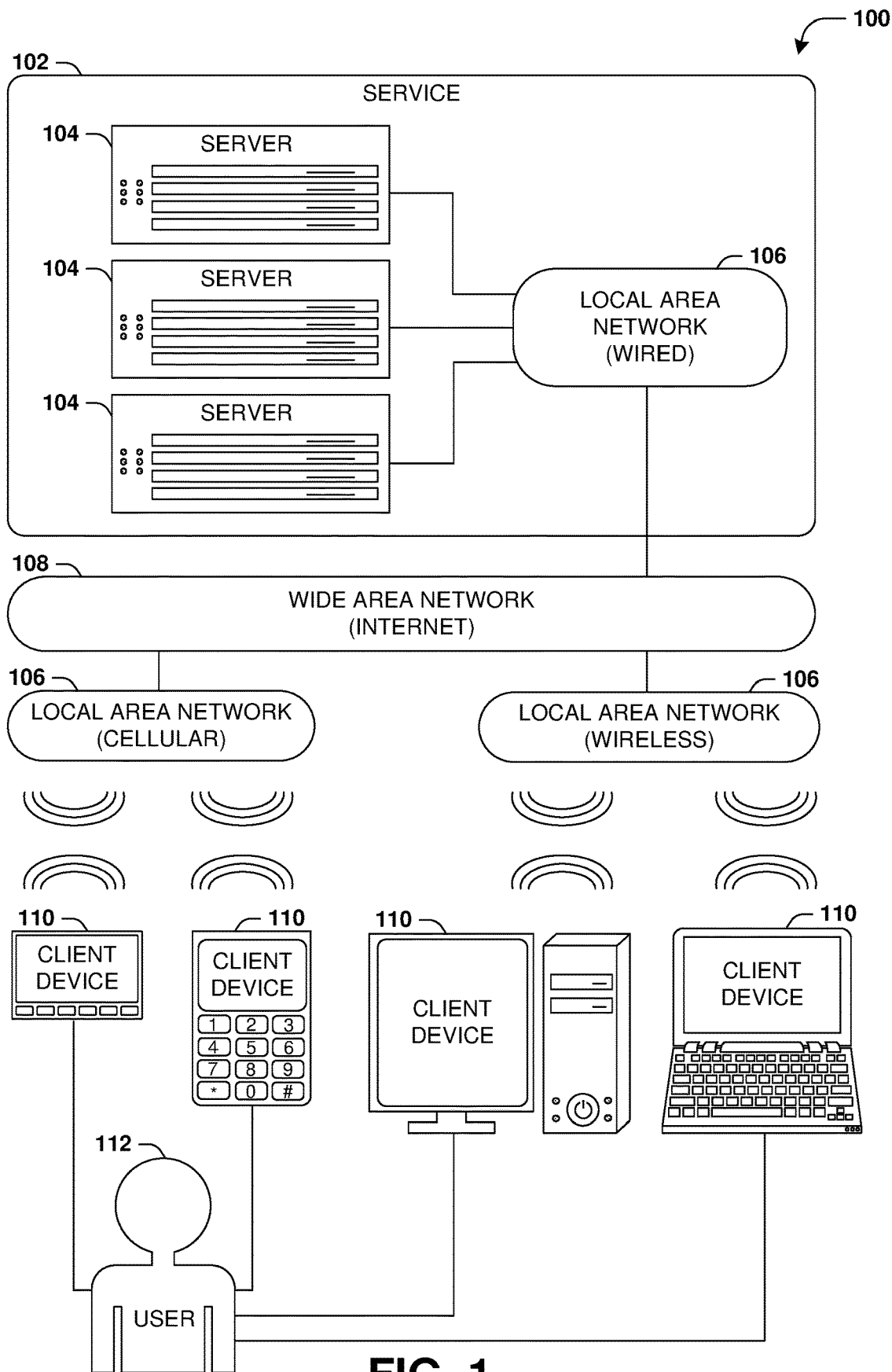
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
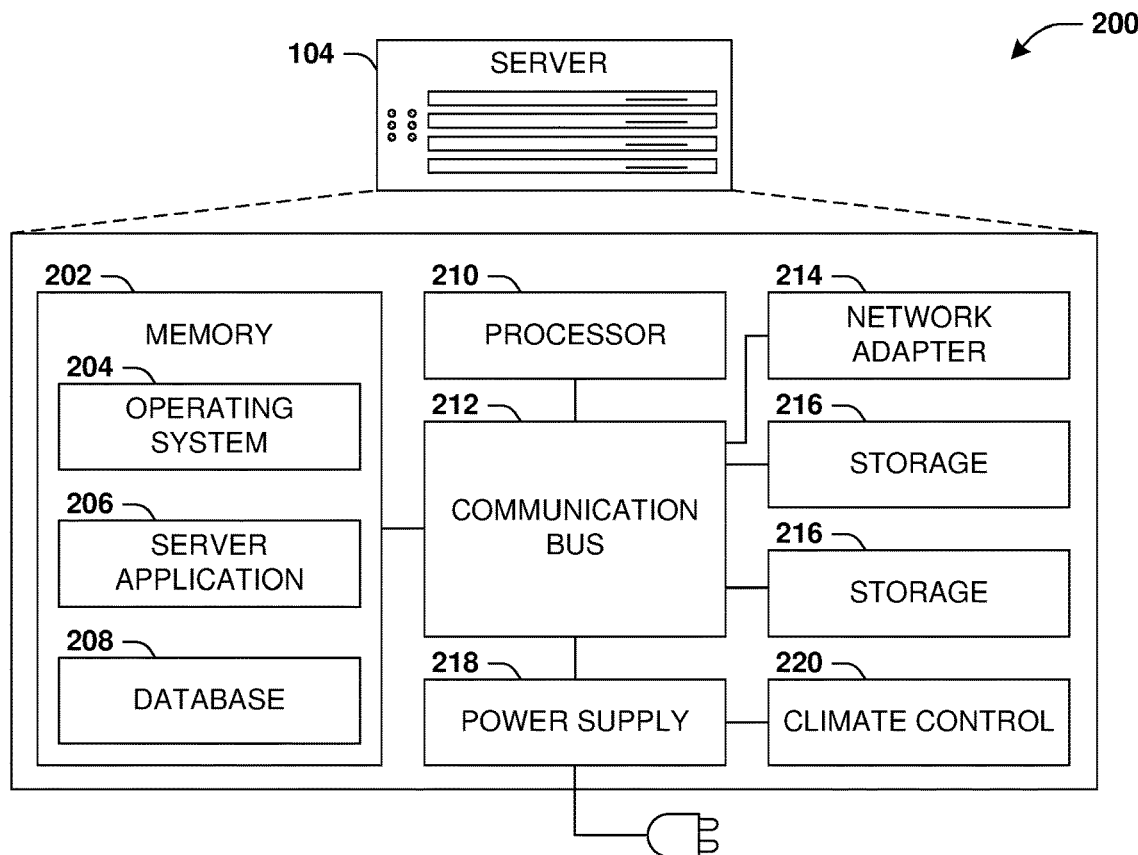
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
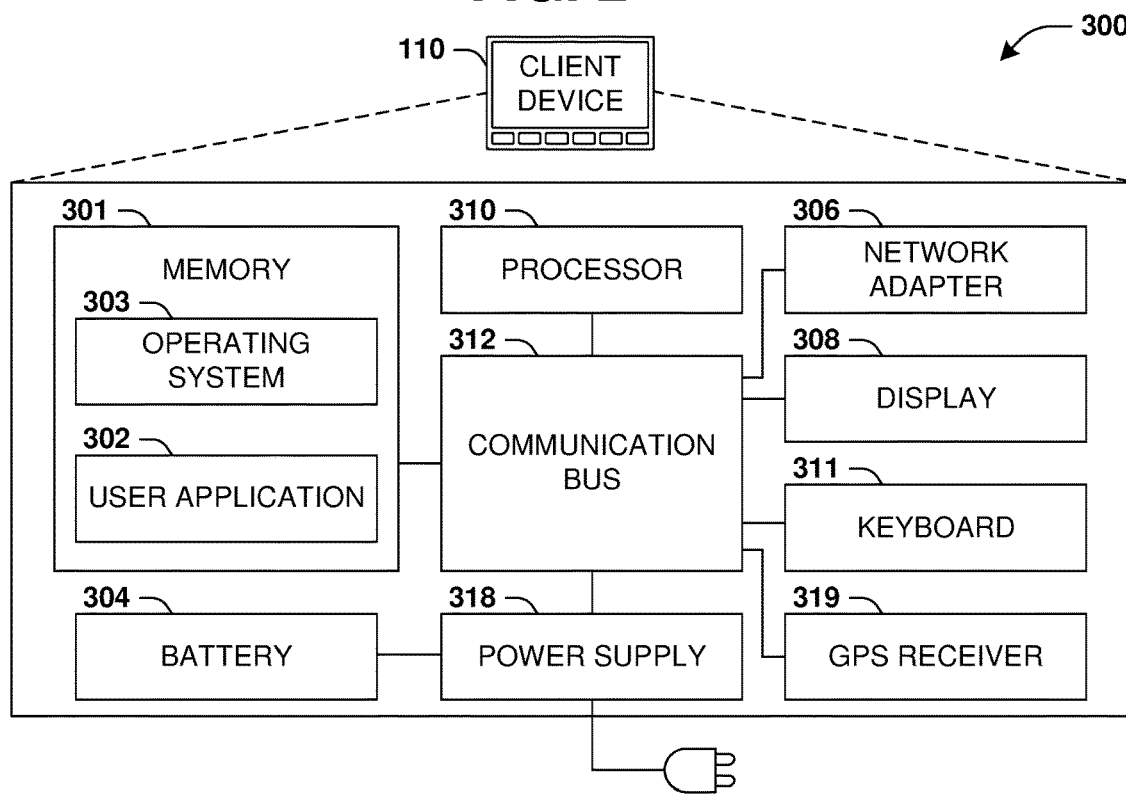
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for generating dynamic content item recommendations are provided. A content serving platform may spend a substantial amount of storage resources, computing resources, and network bandwidth to store, select, and provide content items (content item recommendations) to client devices over a network (e.g., provide content item recommendations such as information, text, audio, images, etc. relating to products, services, media items, and/or other types of content items). Thus, the accuracy of selecting and transmitting certain content items over the network to client devices of particular users that may have an interest in such content items is important so that storage resources, computing resources, and network bandwidth is not wasted by otherwise providing content items to users that may ignore the content items because the content items are irrelevant to those users. To improve the accuracy of selecting content items that will be engaging and relevant to users, the content serving platform may utilize a model, such as a user engagement model, for ranking content items to provide to users through a bidding process.

In an example of the bidding process, content providers may submit bids to the content serving platform (e.g., a model hosted by the content serving platform may generate the scores on behalf of the content providers) to bid on an opportunity to provide a content item to a client device (e.g., to display an image, a video, a message, text, a link to a website, an article, a recommendation, and/or other information about a content item through a user interface, a mobile application, a website, etc.). A score for a content item of a content provider may be based upon a bid value corresponding to an amount the content provider will pay if the user engages with the content item in a certain manner (e.g., viewing a content item recommendation, clicking the content item recommendation, purchasing the content item, etc.) and a predicted likelihood that the user will engaged with the content item. The user engagement model has been trained to output predicted likelihoods that certain types of users will engage with certain types of content items based upon content item attributes of the content items and user attributes of users (e.g., a 23 year old may be more interested in a videogame article than a 70 year old grandma). In this way, content items are ranked/scored based upon their bid values and predicted likelihoods of user engagement so that content items are served in a deterministic manner in order to more accurately provide content items to users that will engage with those content items. In this way, computing resources and network bandwidth is efficiently utilized and not wasted.

Unfortunately, the content serving platform may lack an understanding about what audience of users will find certain content items interesting and engaging, such as content items for which the user engagement model has yet to be trained to output accurate predicted likelihoods of user engagement. One example where the content serving platform may lack information about certain content items is where content providers of websites and application do not provide such information to the content serving platform. For example, a content provider may include a pixel within a website. The pixel may be triggered when a user visiting the website performs a certain action, such as landing at the website, interacting with an element of the website, performing a certain action such as adding a content item to a cart or purchasing the content item, etc. In response to the pixel being triggered, a notification that the user performed the action and/or other information such as information about the user and/or the action (e.g., information about a content item upon which the action was performed) may be transmitted to the content serving platform. In this way, the content serving platform can learn about what types of users engaged with the content item, which can be used to train the user engagement model. Unfortunately, some content providers may forego including pixels within their websites and applications. Thus, the content serving platform may be unable to provide content item recommendations for such content items because the content serving platform lacks adequate information about what types of users will engage with corresponding content items. This greatly limits the audiences that can be reached by the content serving platform.

With pixel-based approaches, information is typically limited to the content provider's internal user-base and traffic of users visiting a website or using an application of the content provider, thus this information is used to serve the same user-base.

Accordingly, as provided herein, the content serving platform may leverage content information extracted from message data in order to dynamically generate content item recommendations of content items described by the content information. In particular, the content serving platform, such as hardware (e.g., a server or other computing device), software (e.g., a virtual machine), and/or combination thereof, may aggregate purchase orders, receipts, recommendations, shopping cart reminders, delivery confirmations, text, images, attachments and/or a variety of other content item information within message data, such as emails, text messages, and/or other types of messages. The content item information may be aggregated to identify attributes of content items (e.g., a brand, color, price, or other information about a car) and/or to calculate popularity of the content items (e.g., a number of times message data comprises information about the car over a particular time period).

The content items may be ranked based upon the popularity and/or attributes of the content items to generate a ranked list of content items. Exploration traffic is served utilizing a set of eligible content items selected from the ranked list of content items (e.g., exploration traffic may be served using a top 100 ranked content items or any other number of content items). The exploration traffic may be served using a first model that takes into account the popularity and/or the attributes of the eligible content items when generating scores used for auctions corresponding to opportunities to show content items to users. Performance of the eligible content items, such as a number of winning scores, a number of impressions of an eligible content item recommendation being shown to users, a number of times users perform certain actions after receiving the eligible content item recommendation, etc., for serving exploration traffic may be tracked.

An eligible content item is promoted for participation in auctions for serving non-exploration traffic based upon the eligible content item being served a threshold number of times or some other criteria being met (e.g., an accumulation of a threshold amount of performance data of what types of users engaged with or ignored the eligible content item for training a second model), which may be determined based upon an evaluation of performance data for the eligible content item. The second model, such as a user engagement model, may have been trained to identify types of users that engaged with and what types of user ignored the eligible content item while the eligible content item was being used to serve exploration traffic. In this way, the second model may be trained to accurately predict interaction probabilities of whether certain users will interact with the eligible content item. Thus, the eligible content item is promoted as a promoted content item that is used to serve non-exploration traffic using the second model.

In contrast to prior pixel-based approaches, the techniques provided herein are based on aggregated information from multiple content providers, and thus the user-base is unlimited. Thus a content provider's reach can be expanding instead of merely being limited to a current user-base of the content provider. Also, $3^{rd}$ party cookie information is not relied upon, which in some circumstances the use of $3^{rd}$ party cookie information is prohibited. To some extent, the email mining phase and the exploration phase complement each other. The exploration phase alone promotes items that show high probabilities of being clicked when displayed, but may not guarantee a high-conversion rate. In contrast, the email mining phase promotes items that were frequently purchased, thus having a better chance to have a high conversion rate. Yet, not all items that are frequently purchased will likely produce highly clicked content items (e.g., toilet paper). Therefore, combining the two phases is a very effective approach.

Figure 4:
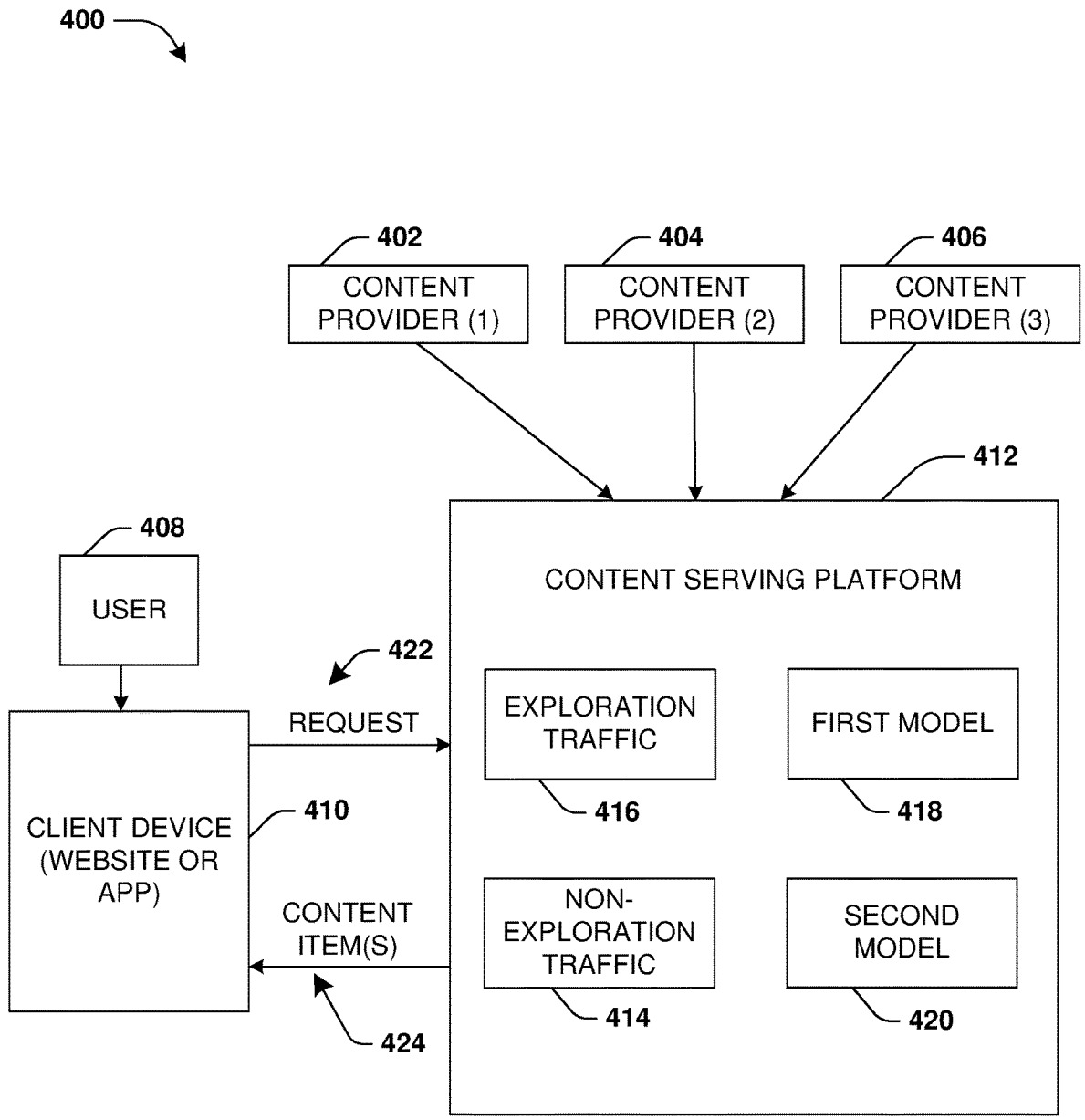
FIG. 4 is a component block diagram illustrating an example system for serving exploration traffic and non-exploration traffic.

FIG. 4 illustrates a system 400 comprising a content serving platform 412 for serving content items (content item recommendations) to users. The content serving platform 412 may be hosted by a server, a virtual machine, a computing device, hardware, software, or combination thereof. Content providers, such as a first content provider 402, a second content provider 404, a third content provider 406, and/or other content providers, may register with the content serving platform 412 in order to bid on auctions corresponding to opportunities to show content items (e.g., show content item recommendations of products, services, media items, etc.) to users. For example, a client device 410 may be used by a user 408 to access a user interface associated with a website or application. The client device 410 may determine that one or more content items could be displayed through the user interface. Accordingly, the client device 410 (or a service hosting the website or application) may transmit a request 422 to the content serving platform 412 for a content item to display through the user interface on the client device 410. The request 422 may comprise information/attributes about the user 408 and/or the website or application being accessed by the user 408.

The content serving platform 412 may receive the request 422 for one or more content items to display to the user 408 through the user interface. The content serving platform 412 may either determine that the request 422 should be processed as exploration traffic 416 using a first model 418 or should be processed as non-exploration traffic 414 using a second model 420 such as a user engagement model (e.g., 2% of requests may be determined to be exploration traffic 416 that are served with content items eligible for serving exploration traffic 416 while 98% of requests may be determined to be non-exploration traffic 414 that are served with content items eligible for serving non-exploration traffic 414).

The second model 420 may be adequately trained to output relatively accurate predicted interaction probabilities as to whether uses will engage with content items served for the non-exploration traffic 414. If the request 422 is determined to be non-exploration traffic 414, then the second model 420 determines scores for content items to submit to an auction, such that a content item with a highest scores will win the auction and will be provided 424 to the user 408 in response to the request 422. For example, the second model 420 determines a score for a content item based upon a bid value that a content provider of the content item will pay for user engagement with the content item (e.g., an impression of a content item recommendation, a user clicking on the content item recommendation, a user purchasing the content item, etc.) and a predicted interaction probability corresponding to a probability output by the second model 420 as to how likely the user 408 will engage with the content item. The score for the content item and scores for other content items determined by the second model 420 are submitted to an auction engine such that a content item with a highest score is selected and provided 424 to the client device 410 for display to the user 408.

If the request 422 is determined to be exploration traffic 416, then the first model 418 is used to generate scores for content items eligible to be used for serving the exploration traffic 416. However, the first model 418 (and the second model 420) may lack an understanding of what types of users will engage with the content items for serving the exploration traffic 416. Thus, serving the exploration traffic 416 may be "expensive" because resources and network bandwidth may be wasted in provided content items to users that will ignore or be annoyed by the content items due to the relatively inaccurate predictions output by the first model 418. Accordingly, as provided herein and described in relation to method 500 of FIG. 5 and system 600 of FIGS. 6A-6D, the accuracy of the first model 418 may be enhanced for dynamically generated content item recommendations by taking into account the popularity and attributes of content items identified from content item information within message data. In this way, content items (new to the content serving platform 412) may be discovered and used to dynamically generate the content item recommendations that can be efficiently and/or accurately served for the exploration traffic 416 in order to train the second model 420 to understand the types of users that will interact with these content items. Once the second model 420 has been adequately trained to recognize types of users that will engage with a content item being served for the exploration traffic 416, then the content item will be promoted to be eligible for serving the non-exploration traffic 414 using the second model 420.

Figure 5:
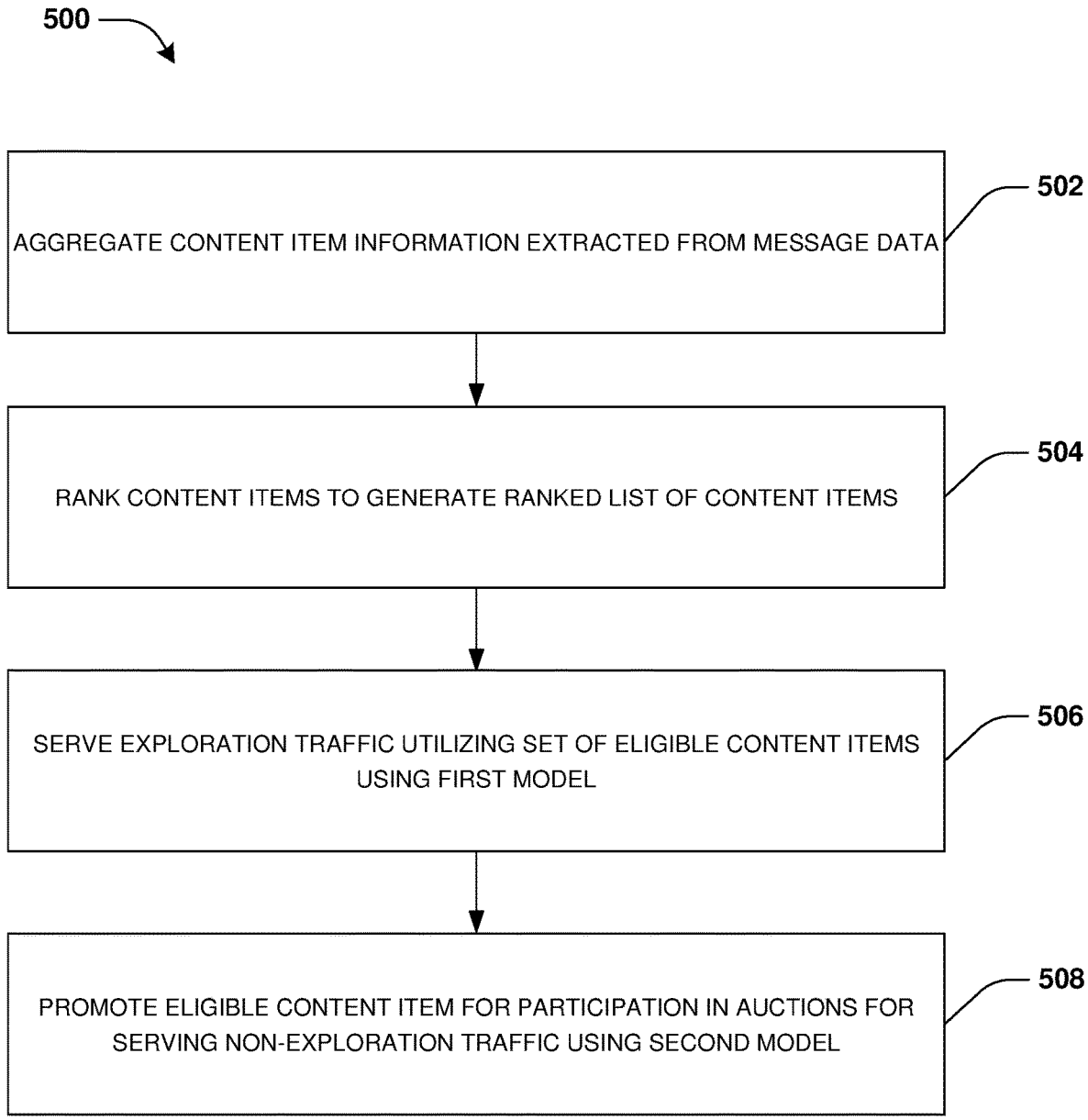
FIG. 5 is a flow chart illustrating an example method for generating dynamic content item recommendations.

An embodiment of generating dynamic content item recommendations is illustrated by an example method 500 of FIG. 5, and is described in conjunction with system 600 FIGS. 6A-6D. The content serving platform 602 may be configured to serve non-exploration traffic 606 using a second model 610, such as a user engagement model, as illustrated by the system 600 of FIG. 6A. The non-exploration traffic 606 may correspond to a percentage of requests (e.g., 95% of requests) from client devices, website providers, and/or application providers of applications accessed by the client devices for content items to display to users accessing the websites and applications. Certain content items may be eligible for serving non-exploration traffic 606, such as content items for which the second model 610 has been trained to generate relatively accurate predicted interaction probabilities of whether certain users will engage with or ignore the content items. In this way, the second model 610 may generate scores for content items that are evaluated by an auction to determine which content item to serve in response to a request directed to the non-exploration traffic 606. A score for a content item may be generated by the second model 610 as a product of a bid value that a content provider of the content item will pay for user engagement of the content item (e.g., viewing a content item recommendation, clicking a content item recommendation, purchasing the content item, etc.) and a predicted interaction probability of how likely a user will engage with the content item. A content item with the highest score may be selected and used to serve the request.

The content serving platform 602 may be configured to serve exploration traffic 604 using a first model 608 in order to "explore" and learn about what types of users will interact with certain types of content items in order to train the second model 610, such as what types of users will interact with dynamically generated content item recommendations of content items. The exploration traffic 604 may correspond to a percentage of requests (e.g., 5% of requests) from client devices, website providers, and/or application providers of applications accessed by the client devices for content items to display to users accessing the websites and applications. Certain content items may be eligible for serving exploration traffic 604, such as content items for which the second model 610 has not yet been trained to generate relatively accurate predicted interaction probabilities of whether certain users will engage with or ignore the content items. Because the second model 610 is unable to accurately generation predicted interaction probabilities for these content items, the first model 608 is used to generate scores for the content items, which are evaluated by an auction to determine which content item to serve in response to a request assigned to the exploration traffic 604. A score for a content item may be generated by the first model 608 as a product of a bid value that a content provider of the content item will pay for user engagement of the content item (e.g., viewing a content item recommendation, clicking a content item recommendation, purchasing the content item, etc.) and a predicted interaction probability of how likely a user will engage with the content item. A content item with the highest score may be selected and used to serve the request.

As provided herein, in order to identify new audiences for content items for which the second model 610 has yet to be trained and to improve the accuracy of the first model 608 in exploring those content items by serving exploration traffic 604 with those content items (e.g., to learn about a target audience of the content items), the content serving platform 602 is configured to take into account content item information within message data 612. The content item information is taken into account in order to weight the first model 608 based upon attributes and popularity of content items identified from the content item information. Accordingly, the content serving platform 602 or other component (e.g., a separate computer or programming module) may obtain message data 612 associated with emails, text messages, social network messages, and/or other types of messages. In an embodiment, the message data 612 is obtained based upon the content serving platform 602 receiving opt-in user consent for access to such message data 612. In an embodiment, the message data 612 corresponds to messages aggregated from a plurality of users in order to preserve privacy of those users. The message data 612 may comprise text, HTML, images, attachments, and/or other content within messages, which may correspond to receipts, delivery confirmations, recommendations of products and services, order confirmations, and/or other content item information relating to various types of content items, such as products (e.g., a shirt, a car, a lawn mower, etc.), services (e.g., a video streaming service), movies, songs, or other types of content/entities.

At 502, the message data 612 is evaluated to identify and extract content item information that is aggregated to calculate content item popularity and attribute information 614. In particular, the message data 612 may be parsed to extract the content item information from the message data 612 based upon text, images, attachments, and/or other data corresponding to information about content items or users associated with the messages. In an embodiment of extracting the content item information from the message data 612, a defined extraction rule (e.g., a user defined extraction rule) may be defined with respect to a set of clusters of messages and/or message templates (e.g., information may be extracted from a message based upon the information matching a message template or being clustered within a cluster of messages corresponding to a content item). The defined extraction rule may be used to extract the content item information from the message data 612.

In an embodiment of extracting the content item information from the message data 612, an extraction rule is generated using a clustering method (e.g., messages having content indicative of a content item may be clustered together in a cluster, such that a message clustered within that cluster may be identified as having content item information associated with that content item). The clustering method may be executed upon machine generated messages (e.g., messages generated to have information corresponding to a content item) in order to generate the extraction rule. The extraction rule may be used to extract the content item information from the message data 612. In an embodiment of extracting the content item information from the message data 612, online extraction may be performed online using various processing techniques such as entity extraction (e.g., functionality that can identify entities such as content items), natural language processing (e.g., functionality to parse text within a message to identify information related to a content item). In this way, various types of extraction methods and functionality may be used to identify and extract content item information from the message data 612.

The content item information is aggregated to calculate and determine the content item popularity and attribute information 614 of content items identified from the content item information. A popularity of a content item may correspond to a number of times or percentage at which the content item occurs within messages. For example, if a shirt is mentioned 500 times out of 100,000 messages and a mower is mentioned 4 times out of the 100,000 message, then the shirt may be deemed to be more popular than the mower. Popularity may be determined over a particular timespan, and thus popularity may be indicative of trendiness such as trends of what is popular during a certain timespan. In an embodiment, a global popularity for a content item may be determined based upon how popular the content item is with respect to all users (e.g., users of accounts from which the message data 612 was extracted). In an embodiment, a plurality of demographic popularities may be determined for a content item amongst various demographics of users. For example, a first demographic popularity for a content item may be determined based upon how popular the content item is with respect to a first demographic of users (e.g., a number of times the content item was described within messages associated with teenagers, males, females, users in the United States, users in the United Kingdom, adults 25 to 35 years old, etc.). A second demographic popularity for the content item may be determined based upon how popular the content item is with respect to a second demographic of users different than the first demographic of users. In this way, popularity of content items with particular demographics of users may be identified (e.g., a mower may be determined to be more popular with users ages 30 to 65 than teenagers).

The content item information may be aggregated to identify attributes of content items. For example, an attribute of a shirt may be a size, a color, a price, whether the item is for women, men, or children, and/or the attribute may relate to information about the user that is associated with the message within which the shirt was described. In an embodiment, an attribute of a content item may correspond to a category of the content item, such as lawn equipment. In an embodiment, an attribute of a content item may correspond to a price of the content item, such as a price of the mower. In an embodiment, an attribute of a content item may correspond to whether the content item is a premium product a price exceeding a threshold (e.g., typically prices of watches may be between $15 and $500, but a watch may be determined as a premium item based upon the watch having a price greater than 3 times the top range of typically watches, such as a price greater than $1,500).

In an embodiment, an attribute of a content item may correspond to an age of a user whose account a message mentioning the content item was extracted. In an embodiment, an attribute of a content item may correspond to a location (e.g., a country, state, city, etc.) of a user whose account a message mentioning the content item was extracted. In an embodiment, an attribute of a content item may correspond to a gender of a user whose account a message mentioning the content item was extracted (e.g., certain watches may be more commonly bought by females, while other types of watches may be more commonly bought by males). In this way, various attributes may be determined for a content item as an array of attributes.

In an embodiment, certain attributes may be excluded/collapsed from the array of attributes because such attributes may be "noise" and unhelpful for determining what types of users will have an interest in certain content items (e.g., an amount of memory of a phone, whether the phone is unlocked or tied to a particular phone carrier, etc.). In an embodiment, an attribute may be identified for exclusion from the array of attributes for a content item using a manually generated exclusion rule (e.g., a user may specify that the amount of memory of a phone is to be excluded). In an embodiment, an attribute may be identified for exclusion from the array of attributes for a content item using distributed hierarchical clustering configured to identify attributes to exclude. In an embodiment, an attribute may be identified for exclusion from the array of attributes for a content item using locality-sensitive hashing configured to identify attributes to exclude.

Figure 6A:
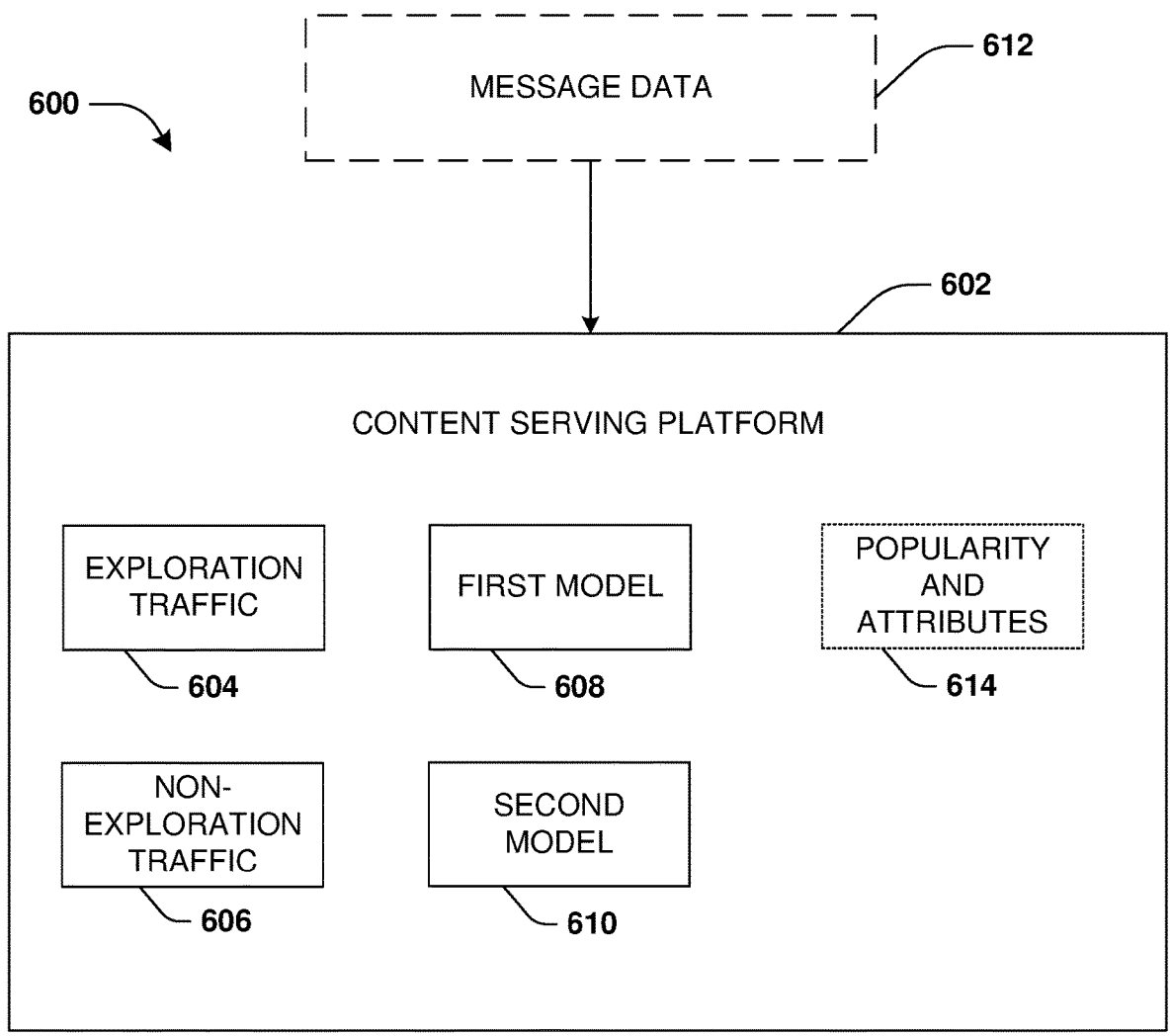
FIG. 6A is a component block diagram illustrating an example system for generating dynamic content item recommendations, where popularity and attributes of content items are extracted from message data.
Figure 6B:
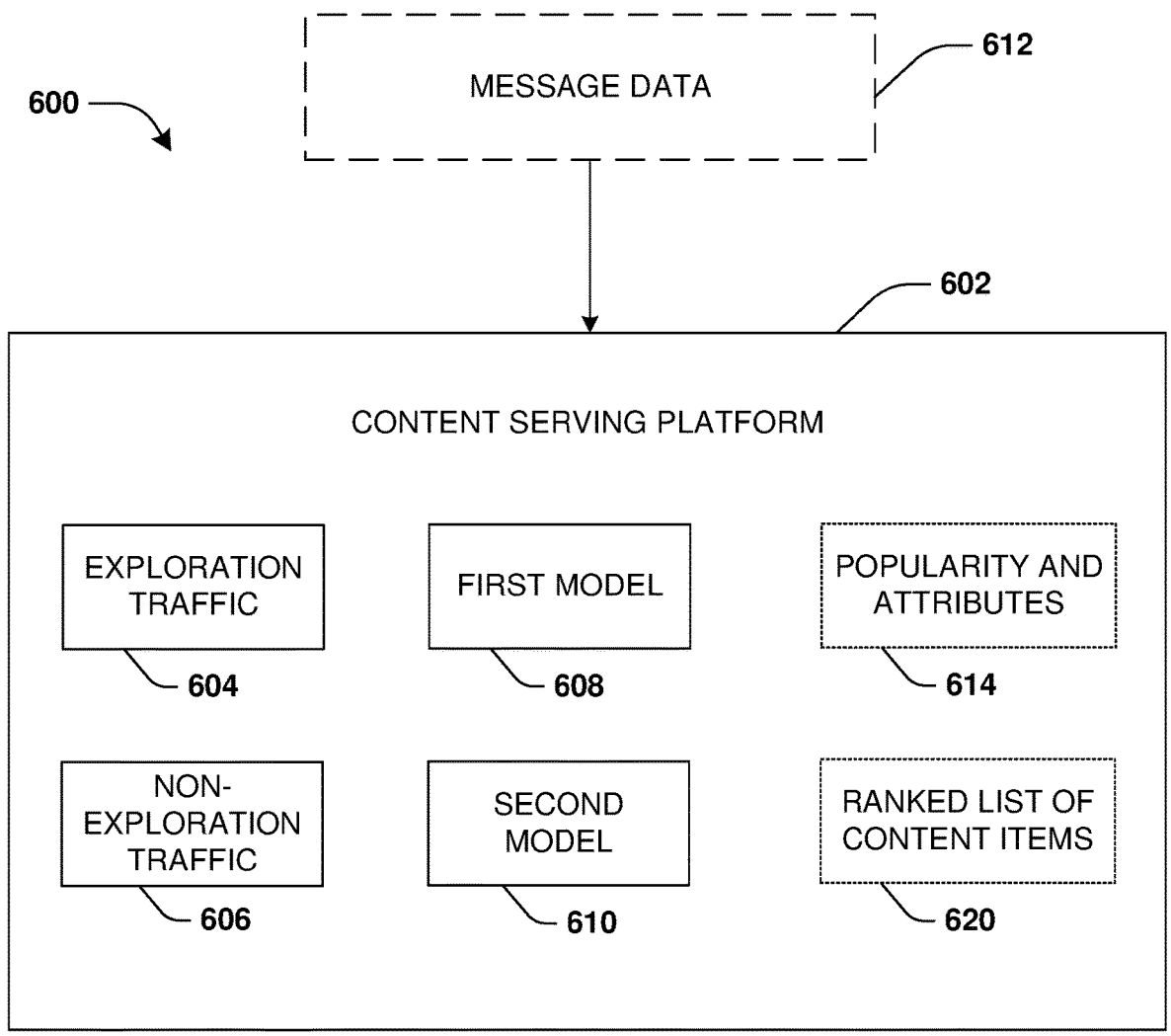
FIG. 6B is a component block diagram illustrating an example system for generating dynamic content item recommendations, where a ranked list of content items is identified.

At 504, the content items are ranked based upon the content item popularity and attributes information 614 to generate a ranked list of content items 620, as illustrated by FIG. 6B. For example, ranks may be assigned to content items based upon the popular of the content items, such as global popularity of each content item and/or demographic popularities of each content item. The more popular a content item, then higher the rank that is assigned to the content item. Other factors may be taken into account when ranking content items. For example, trends and trendiness may be taken into account, such as where a content item with a recent increase in popularity may be assigned a higher rank than a content item that was previously popular in the past as opposed to recently. Attributes of content items may also be taken into account when ranking content items, such as where a rank of a content item may be increased or decreased based upon whether the content item is associated with a particular attribute.

Figure 6C:
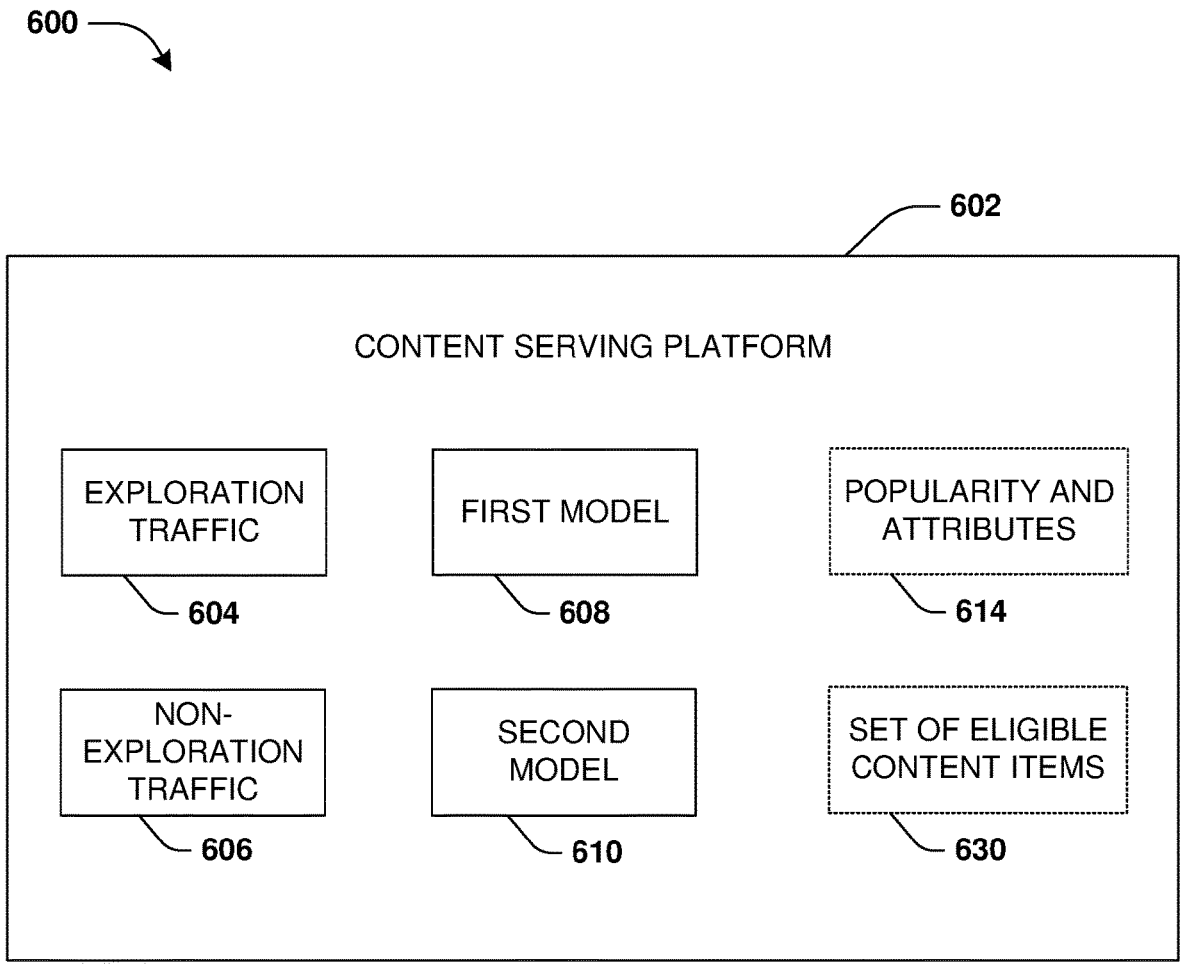
FIG. 6C is a component block diagram illustrating an example system for generating dynamic content item recommendations, where a set of eligible content items is identified and used to serve exploration traffic.

Because the ranked list of content items 620 may be relatively large (e.g., hundreds of thousands of content items or more), a subset of the content items may be selected from the ranked list of content items 620 as eligible content items to generate a set of eligible content items 630, as illustrated by FIG. 6C. For example, a top 100 ranked content items or any other number of content items may be selected as eligible content items for inclusion within the set of eligible content items 630 based upon ranks of the content items. At 506, the set of eligible content items 630 are utilized to serve exploration traffic 604 using the first model 608. That is, the set of eligible content items 630 will participate in auctions corresponding to opportunities to display content items to users (e.g., a content item(s) with a highest score in an auction will be selected and provided to a client device or other requestor, such as a host of a website being accessed by the client device, to display to a user of the client device).

The first model 608 may be used to generate scores for the set of eligible content items 630 to submit to the auctions. The first model 608 may determine a score for an eligible content item based upon a bid value a content provider of the eligible content item will pay for user interaction with the eligible content item (e.g., viewing a content item recommendation, clicking a content item recommendation, purchasing the content item, etc.) multiplied by a predicted interaction probability derived by the first model 608 based upon a popularity and attributes of the eligible content item. The predicted interaction probability may be derived from other information too, such as user attributes of a user to which a content item with a winning score will be shown. Because the first model 608 is weighted based upon the popularity and attributes of the eligible content item, the first model 608 may output relatively higher predicted interaction probabilities for eligible content items that are more popular than other eligible content items. Performance of eligible content items may be tracked, such as a number of times an eligible content item wins or loses auctions, how often the eligible content item (an eligible content item recommendation) is shown to users, is clicked by users, is purchased by users, etc.

Figure 6D:
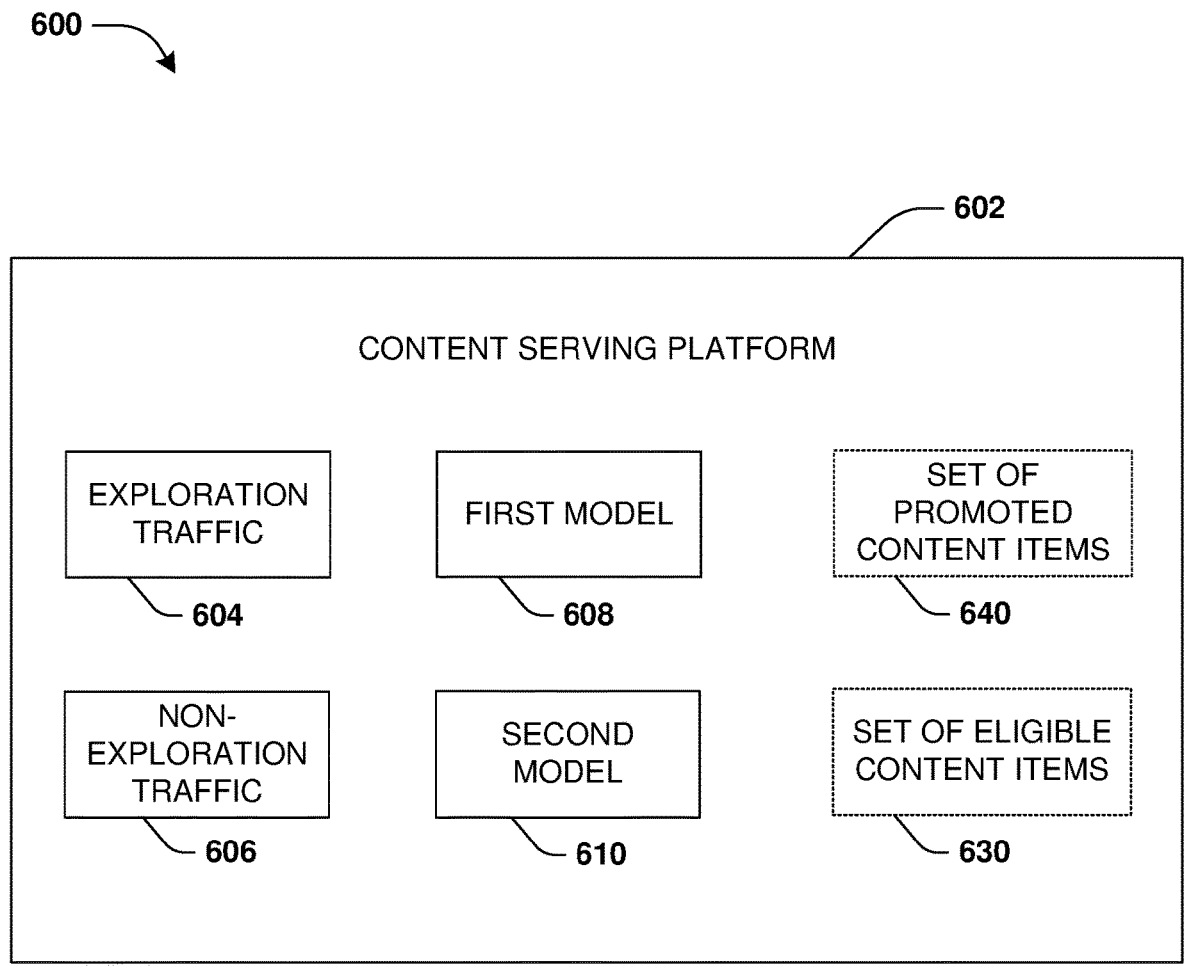
FIG. 6D is a component block diagram illustrating an example system for generating dynamic content item recommendations, where a set of promoted content items is identified and used to serve non-exploration traffic.

The performance of the eligible content items may be evaluated to identify an eligible content item that has been served a threshold number of times for requests associated with the exploration traffic 604. At 508, the eligible content item is promoted as a promoted content item within a set of promoted content items 640 for participation in auctions for serving the non-exploration traffic 606 using the second model 610 based upon the eligible content item being served the threshold number of times, as illustrated by FIG. 6D. The eligible content item is promoted because the second model 610 may have been adequately trained to learn a type of audience that will engage with the eligible content item based upon whether users provided with the eligible content item interacted with or performed certain actions with respect to the eligible content item when the eligible content item was used to serve the exploration traffic 604 using the first model 608. In this way, the second model 610 will generate scores for the set of promoted content items 640 and/or other content items designated as being available to serve the non-exploration traffic 606. The scores may be based upon bid values and predicted interaction probabilities determined by the second model 610. In this way, dynamic content item recommendations may be generated based upon content item information extracted from message data.

Figure 7:
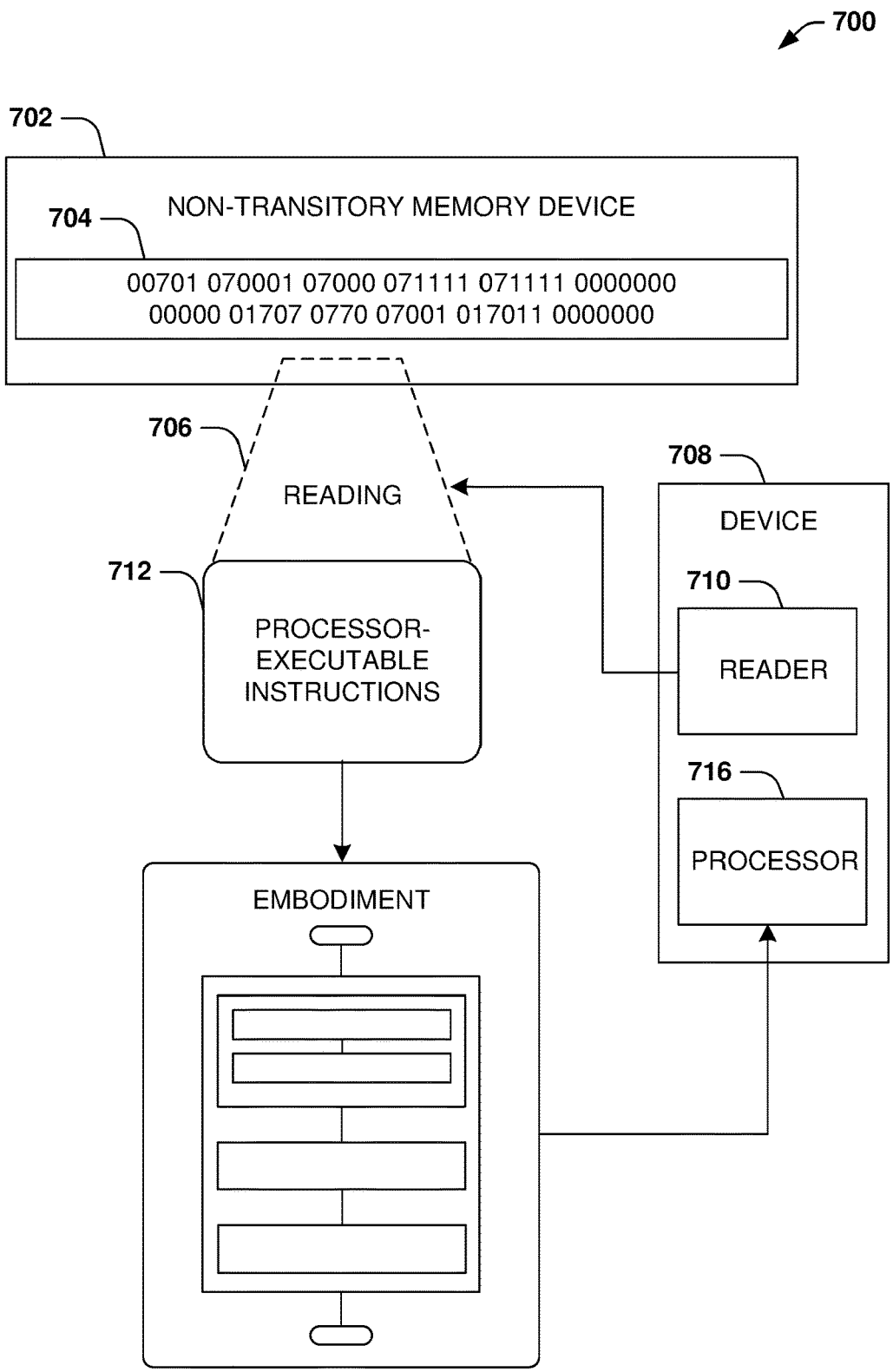
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 500 of FIG. 5, for example. In some embodiments, the processor-executable instructions 712 are configured to cause implementation of a system, such as at least some of the example system 600 of FIGS. 6A-6D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
generating machine generated messages, wherein the machine generated messages are generated by a machine to have information corresponding to a content item;
generating an extraction rule by executing a clustering method upon the machine generated messages;
performing online extraction of content item information from message data using the extraction rule, wherein the online extraction is performed using at least one of entity extraction or natural language processing;
serving exploration traffic utilizing a set of eligible content items, wherein a first model is used to generate scores for the set of eligible content items to be served for the exploration traffic based upon bid values and predicted interaction probabilities derived from the set of eligible content items;
in response to an eligible content item being served a threshold number of times, promoting the eligible content item for participation in auctions for serving non-exploration traffic using a second model, wherein the second model is trained with user engagement feedback indicating that one or more users at least one of engaged with or did not engage with one or more eligible content items of the set of eligible content items; and
in response to receiving a request for one or more content items:
based upon at least one of whether a sufficient amount of feedback has been received for the one or more content items or whether the second model has been adequately trained to recognize one or more types of users that will engage with the one or more content items, determining whether the request should be processed as (i) exploration traffic using the first model or (ii) non-exploration traffic for which user engagement is predicted using the second model trained with the user engagement feedback; and
processing the request to serve content using the first model or the second model in accordance with the determination.

2. The method of claim 1, comprising:
excluding an attribute from use in determining the set of eligible content items based upon at least one of a manually generated exclusion rule or distributed hierarchical clustering.

3. The method of claim 1, comprising:
excluding an attribute from use in determining the set of eligible content items based upon locality-sensitive hashing.

4. The method of claim 1, comprising:
determining global popularity for a content item.

5. The method of claim 1, comprising:
determining a first demographic popularity for a content item with respect to a first demographic of users and second demographic popularity for the content item with respect to a second demographic of users.

6. The method of claim 1, comprising:
generating an array of attributes for a content item based upon extracted message data.

7. The method of claim 1, comprising:
determining a category of a content item as an attribute for the content item based upon extracted message data.

8. The method of claim 1, wherein the online extraction is performed using entity extraction.

9. The method of claim 1, wherein the online extraction is performed using natural language processing.

10. A computing device comprising:
a processor; and
memory comprising processor-executable instructions that when executed by the processor cause performance of operations, the operations comprising:
generating machine generated messages, wherein the machine generated messages are generated by a machine to have information corresponding to a content item;
generating an extraction rule by executing a clustering method upon the machine generated messages;
performing online extraction of content item information from message data using the extraction rule, wherein the online extraction is performed using at least one of entity extraction or natural language processing;
serving exploration traffic utilizing a set of eligible content items, wherein a first model is used to generate scores for the set of eligible content items to be served for the exploration traffic based upon bid values and predicted interaction probabilities derived from the set of eligible content items;
in response to an eligible content item being served a threshold number of times, promoting the eligible content item for participation in auctions for serving non-exploration traffic using a second model, wherein the second model is trained with user engagement feedback indicating that one or more users at least one of engaged with or did not engage with one or more eligible content items of the set of eligible content items; and
in response to receiving a request for one or more content items, processing the request as (i) exploration traffic using the first model or (ii) non-exploration traffic for which user engagement is predicted using the second model trained with the user engagement feedback, wherein the processing is based upon at least one of whether a sufficient amount of feedback has been received for the one or more content items or whether the second model has been adequately trained to recognize one or more types of users that will engage with the one or more content items.

11. The computing device of claim 10, comprising:
determining an attribute of a content item as a price of the content item.

12. The computing device of claim 10, comprising:
determining an attribute of a content item based upon whether the content item is a premium product having a price exceeding a threshold.

13. The computing device of claim 10, comprising:
determining an attribute of a content intent identified from a message associated with a user based upon an age of the user.

14. The computing device of claim 10, comprising:
determining an attribute of a content intent identified from a message associated with a user based upon a location of the user.

15. The computing device of claim 10, comprising:
determining an attribute of a content intent identified from a message associated with a user based upon a gender of the user.

16. The computing device of claim 10, wherein the online extraction is performed using entity extraction.

17. A non-transitory machine readable medium having stored thereon processor-executable instructions that when executed cause performance of operations, the operations comprising:
generating machine generated messages, wherein the machine generated messages are generated by a machine to have information corresponding to a content item;
generating an extraction rule by executing a clustering method upon the machine generated messages;
performing online extraction of content item information from message data using the extraction rule, wherein the online extraction is performed using at least one of entity extraction or natural language processing;
serving exploration traffic utilizing a set of eligible content items, wherein a first model is used to generate scores for the set of eligible content items to be served for the exploration traffic based upon bid values and predicted interaction probabilities derived from the set of eligible content items;
selecting a subset of the set of eligible content items as a set of promoted content items based upon performance of the set of eligible content items for serving the exploration traffic, wherein a second model is trained with user engagement feedback indicating that one or more users at least one of engaged with or did not engage with one or more eligible content items of the set of eligible content items;
utilizing the second model trained with the user engagement feedback to generate scores for the set of promoted content items to be served for non-exploration traffic; and
in response to receiving a request for one or more content items, processing the request as (i) exploration traffic using the first model or (ii) non-exploration traffic for which user engagement is predicted using the second model trained with the user engagement feedback, wherein the processing is based upon at least one of whether a sufficient amount of feedback has been received for the one or more content items or whether the second model has been adequately trained to recognize one or more types of users that will engage with the one or more content items.

18. The non-transitory machine readable medium of claim 17, wherein the operations comprise:
weighting the first model based upon popularity of content items.

19. The non-transitory machine readable medium of claim 17, wherein the operations comprise:
weighting the first model based upon attributes of content items.

20. The non-transitory machine readable medium of claim 17, wherein the message data comprises at least one of a receipt, a delivery confirmation, a recommendation, or an order confirmation, and wherein a content item comprises at least one of a product, a service, or a media item.

* * * * *